United States Patent [19]

Bueschges et al.

[11] Patent Number: 5,188,998
[45] Date of Patent: Feb. 23, 1993

[54] TRANSITION-METAL CATALYST COMPONENT FOR A ZIEGLER CATALYST SYSTEM, AND THE USE OF SAID SYSTEM

[75] Inventors: Ulrich Bueschges, Mannheim; Roland Saive, Ludwigshafen, both of Fed. Rep. of Germany

[73] Assignee: BASF Aktiengesellschaft, Ludwigshafen, Fed. Rep. of Germany

[21] Appl. No.: 671,591

[22] Filed: Mar. 19, 1991

[30] Foreign Application Priority Data

Mar. 19, 1990 [DE] Fed. Rep. of Germany ....... 4008732

[51] Int. Cl.$^5$ .............................................. C08F 4/68
[52] U.S. Cl. .................... 502/107; 502/104; 502/111; 502/120; 502/125; 502/127; 526/129
[58] Field of Search ............... 502/104, 107, 111, 120, 502/125, 127

[56] References Cited

U.S. PATENT DOCUMENTS

| | | | |
|---|---|---|---|
| 3,242,150 | 3/1966 | Scoggin | 260/88.2 |
| 3,462,399 | 8/1969 | Matthews | 260/80.78 |
| 4,487,845 | 12/1984 | Triplett | 502/125 X |
| 4,508,842 | 4/1985 | Beran et al. | 502/112 |
| 4,568,659 | 2/1986 | Warzelhan et al. | 502/113 X |
| 4,579,919 | 4/1986 | Staiger et al. | 502/125 X |
| 4,581,426 | 4/1986 | Asanuma et al. | 502/125 X |
| 4,705,835 | 11/1987 | Warzelhan et al. | 502/113 X |
| 4,710,552 | 12/1987 | Bachl et al. | 502/113 X |
| 4,814,314 | 3/1989 | Matsuura et al. | 502/127 X |
| 4,999,327 | 3/1991 | Kao et al. | 502/119 |

FOREIGN PATENT DOCUMENTS

| | | |
|---|---|---|
| 004645 | 12/1984 | European Pat. Off. . |
| 078996 | 6/1985 | European Pat. Off. . |
| 158013 | 10/1985 | European Pat. Off. . |
| 166888 | 6/1988 | European Pat. Off. . |
| 0312876 | 4/1989 | European Pat. Off. . |
| 545111 | 3/1932 | Fed. Rep. of Germany . |
| 3239883 | 5/1984 | Fed. Rep. of Germany . |

*Primary Examiner*—Patrick P. Garvin
*Attorney, Agent, or Firm*—Keil & Weinkauf

[57] ABSTRACT

A transition-metal catalyst component for a Ziegler catalyst system, obtainable by
1) mixing an inorganic, oxidic carrier with a transition-metal starting component in an organic solvent,
2) removing the solvent by evaporation,
3) mixing the solid-phase intermediate from step (2) with
3.1) an organoaluminum catalyst component of the formula $AlR_mX_{3-m}$, where
R is a $C_1$- to $C_{18}$-hydrocarbon radical,
m is from 1 to 3, and
X is OR, chlorine, bromine or hydrogen, and
3.2) an organic carboxylate or an organosilicon compound or a mixture thereof in an organic solvent, and
4) if desired, isolating the solid-phase intermediate by filtration, washing and drying, and the use thereof for the homopolymerization or copolymerization of ethene are described.

6 Claims, No Drawings

TRANSITION-METAL CATALYST COMPONENT FOR A ZIEGLER CATALYST SYSTEM, AND THE USE OF SAID SYSTEM

The present invention relates to a transition-metal catalyst component for a Ziegler catalyst system, obtainable by 1) mixing an inorganic, oxidic carrier with a solution of a transition-metal starting component in an organic solvent or solvent mixture,
2) removing the solvent by evaporation,
3) mixing the solid-phase intermediate from step (2) with
   3.1) an organoaluminum catalyst component of the formula $AlR_mX_{3-m}$, where
      R is a $C_1$- to $C_{18}$-hydrocarbon radical,
      m is from 1 to 3, and
      X is OR, chlorine, bromine or hydrogen, and
   3.2) an organic carboxylate or an organosilicon compound or a mixture thereof in an organic solvent, and
4) if desired, isolating the solid-phase intermediate by filtration, washing and drying.

The present invention furthermore relates to the use of this catalyst component in a Ziegler catalyst system for the preparation of a homopolymer of ethene or a copolymer of ethene with minor amounts of a $C_3$- to $C_8$-, in particular $C_4$- to $C_6$-α-monoolefin by polymerizing the monomers at from 30° to 200° C., preferably from 50° to 100° C., and at from 1 to 200 bar.

Polymerization processes of this type are known and have been described, for example, in EP-A 0 166 888. The transition-metal catalyst component (1) published therein, which is obtainable from a transition-metal starting component (2b), comprising a mixture of a vanadium component and a titanium component and, if desired, a zirconium tetrahalide, allows homopolymers and copolymers of ethene to be prepared with a specific, very broad molecular weight distribution and with good productivity and grain quality of the products. However, for specific objectives, such as the preparation of high-molecular-weight, high density products, the productivity of the system and the grain quality of the resultant polymers are still inadequate. In addition, the resistance to environmental stress cracking and the bubble stability on film blowing are also in need of improvement. It is also necessary to reduce the hydrocarbon-soluble components and the gel content.

EP-A 0 078 996 discloses a transition-metal catalyst component (1) which is obtainable by applying $VCl_3$ from an alcohol as solvent onto $SiO_2$ and then carrying out a second step involving reaction with an alkylaluminum compound. However, this catalyst component is not suitable for achieving the aim of preparing homopolymers or copolymers of ethene having good grain quality and a moderately broad molecular weight distribution at the same time as good productivity. In addition, the resistance to environmental stress cracking and the bubble stability on film blowing are still in need of improvement. It is also still necessary to reduce the amount of hydrocarbon-soluble components and the gel content.

Finally, U.S. Pat. No. 4,508,842 describes a transition-metal catalyst component (1) which is prepared by applying $VCl_3$ from an electron donor as a solvent onto $SiO_2$. However, the chosen amounts of transition metal on the $SiO_2$ are again unsuitable for achieving the aim of producing polymers having good grain quality at the same time as good productivity. In addition, the resistance to environmental stress cracking and the bubble stability on film blowing are still in need of improvement. It is also still necessary to reduce the hydrocarbon-soluble components and the gel content.

It is an object of the present invention to provide a novel transition-metal catalyst component which, in contrast to known catalyst components, allows the preparation of a polymer, in particular a copolymer of ethene with higher α-olefins, having a moderately broad molecular weight distribution, good grain quality, high resistance to environmental stress cracking, low hydrocarbon-soluble components, particularly good bubble stability on film blowing and an extremely low gel content at the same time as high productivity.

We have found that this object is achieved by the transition-metal catalyst component defined at the outset, and a process for the preparation of a homopolymer of ethene or a copolymer of ethene with minor amounts of a $C_3$- to $C_8$-α-monoolefin by polymerizing the monomers at from 30° to 200° C. and at from 0.1 to 200 bar using a Ziegler catalyst system comprising A) a transition-metal catalyst component and
B) an organoaluminum catalyst component of the formula $AlR_mX_{3-m}$, where
   R is a $C_1$- to $C_{18}$-hydrocarbon radical,
   m is from 1 to 3, and
   X is OR, chlorine, bromine or hydrogen, and
C) an additional catalyst component which is either an organohalogen compound or an inorganic or organic nitrogen-oxygen compound, in which the transition-metal catalyst component according to the invention is used as component A).

The following details apply to the individual components of the system and to individual process steps:

Examples of suitable inorganic, oxidic carriers in step 1 are silica, borosilicate and aluminosilicate, aluminum phosphate and silicon-metal cogels, where the metal may be, for example, magnesium, titanium and/or zirconium. The carriers generally have a particle diameter of from 1 to 1,000 μm, preferably from 1 to 400 μm, a pore volume of from 0.3 to 3 m³/g, preferably from 1 to 2.5 m³/g, and a surface area of from 100 to 1,000 m²/g, preferably from 200 to 400 m²/g. An aluminosilicate of the formula $SiO_2 \cdot aAl_2O_3$ where a is from 0 to 2, preferably from 0 to 0.5, has proven particularly successful.

The step (1) transition-metal starting component is also known and is described, for example, in EP-C-0 166 888, EP-158 018 and U.S. Pat. No. 4,568,659. It is possible to use compounds of vanadium, titanium or zirconium, or a mixture of these compounds. Particular success has been achieved using a vanadium trihalide/alcohol complex of the formula $VY_3 \cdot nZ-OH$, where Y is chlorine or bromine, preferably chlorine,
n is from 1 to 6, preferably from 3 to 4, and
Z is a monovalent, saturated-aliphatic or partially saturated-aliphatic, partially aromatic hydrocarbon radical having not more than 10, preferably not more than 8, carbon atoms, in particular an alkyl radical having not more than 6 carbon atoms.

The parent vanadium trihalide here can be one which is conventional in Ziegler catalyst systems. Examples of suitable alcohol components are methanol, ethanol, 2-propanol, 2-butanol and 2-methyl-2-butanol. The complexes can be prepared from vanadium trichloride and 2-propanol in tetrahydrofuran as solvent by conventional methods, e.g. by the method of D. C. Bradley, M. L. Metha, Can. J. Chem., 40 (1962), 1710/3. The complexes can be employed individually or as mixtures of a plurality of complexes.

Suitable organic solvents in step (1) are saturated aliphatic or partially saturated-aliphatic, partially aromatic hydrocarbons containing 1 or 2 oxa oxygen atoms and from 3 to 19 carbon atoms, preferably saturated aliphatic or partially saturated-aliphatic, partially aromatic oxahydrocarbons containing one oxa oxygen atom and from 3 to 11 carbon atoms, in particular cyclized, saturated, aliphatic oxahydrocarbons containing one oxa oxygen atom and from 4 to 6 carbon atoms. Examples of suitable solvents are ethylene glycol dimethyl ether, anisole, tetrahydrofuran, dioxane and mixtures of these.

The step (3.1) component is an organoaluminum catalyst component of the formula $AlR_mX_{3-m}$, where R is a $C_1$- to $C_{18}$-hydrocarbon radical, preferably a $C_1$- to $C_{12}$-alkyl radical, in particular a $C_2$- to $C_8$-alkyl radical, m is from 1 to 3, preferably from 2 to 3, in particular 2, and X is OR, chlorine, bromine or hydrogen, preferably OR or chlorine, in particular chlorine.

Examples of suitable organoaluminum compounds are $Al(C_2H_5)_3$, $Al(C_2H_5)_2Cl$, $Al(C_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_2H_9)Cl_2$, $Al(C_4H_9)_2H$, $Al(C_4H_9)_2H$, $Al(C_3H_7)_2(OC_3H_7)$ or $Al(C_2H_5)_{1.5}(OC_2H_5)_{1.5}$, isoprenylaluminum and mixtures thereof. Particularly suitable aluminum compounds are those of the formula $C_2H_5AlCl_2$ or $(C_2H_5)_2AlCl$ and isoprenylaluminum.

Preferred ratios between component (2) and component (3.1) are from 1:5 to 1:0.1.

Suitable organic carboxylates or organosilicon compounds of step (3.2) are compounds of the following formula:

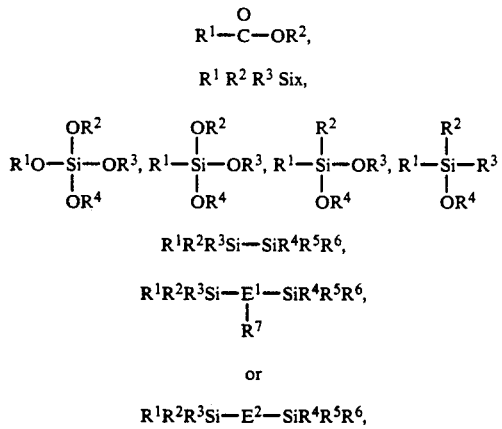

where $R^1$ to $R^6$ are an aliphatic, aromatic or araliphatic $C_1$- to $C_{12}$-hydrocarbon radical, preferably aliphatic, aromatic or araliphatic $C_1$- to $C_{12}$-alkyl, in particular $C_2$- to $C_8$-alkyl, phenyl or phenyl($C_2$- to $C_8$-)alkyl, $R^7$ is hydrogen or a $C_1$-$C_{12}$-hydrocarbon radical, preferably hydrogen or $C_1$-$C_{12}$-alkyl, in particular hydrogen, X is bromine, chlorine or an unsaturated $C_2$- to $C_{18}$-hydrocarbon radical, preferably bromine, chlorine or unsaturated $C_2$- to $C_{12}$-alkenyl, in particular chlorine or $C_2$- to $C_8$-alkenyl, $E^1$ is an element from main group V, preferably nitrogen, phosphorus or arsenic, in particular nitrogen, $E^2$ is an element from main group VI, preferably sulfur or oxygen, in particular oxygen.

Examples of suitable organic carboxylates are methyl, ethyl, propyl, butyl, pentyl or phenyl esters of acetic acid, benzoic acid, phenylacetic acid and derivatives thereof which are substituted on the aromatic ring by alkyl. Preference is given to phenyl, benzyl, t-butyl and neopentyl esters of acetic acid, benzoic acid and phenylacetic acid.

Examples of suitable silicon compounds are trimethyl-, triethyl-, tripropyl-, tributyl-, tripentyl-, trihexyl- and triphenylchlorosilane and their analogs which are substituted by different substituents, tetramethoxy-, tetraethoxy-, tetrapropoxy- and tetrabutoxysilane, methyl-, ethyl-, propyl- and butyltrimethoxysilane, -triethoxysilane, -tripropoxysilane and -tributoxysilane, dimethyl-, diethyl-, dipropyl- and dibutyldimethoxysilane, -diethoxysilane, -dipropoxysilane and -dibutoxysilane, trimethyl-, triethyl-, tripropyl- and tributylmethoxysilane, -ethoxysilane, -propoxysilane and -butoxysilane, hexamethyl-, hexaethyl- and hexapropyldisilane, hexamethyl-, hexaethyl- and hexapropyldisilazane, and hexamethyl-, hexaethyl- and hexapropyldisiloxane.

Preference is given to tributyl-, tripentyl-, trihexyl- and triphenylchlorosilane, tetrapropoxy- and tetrabutoxysilane, i-propyl- and i-butyltrimethoxysilane and -triethoxysilane, di-i-propyl- and di-i-butyldimethoxysilane and -diethoxysilane, trimethyl- and triethyl-i-propoxysilane and -i-butoxysilane, hexamethyldisilane, hexamethyldisilazane and hexamethyldisiloxane.

The solvent in step (3.2) is an organic solvent which is inert to the step (3) component. Examples of suitable solvents are hydrocarbons, such as hexane, heptane, petroleum ethers or saturated hydrocarbons which are liquid at room temperature. Preference is given to pentane, hexane and heptane.

To prepare the mixture in step (1), the transition-metal starting component is preferably dissolved in one of the abovementioned solvents or solvent mixtures, and the inorganic, oxidic carrier is added with stirring, either as the solid or suspended in one of the abovementioned solvents or solvent mixtures, and the mixture is stirred for a further 15 to 200 minutes at room temperature. The weight ratio between the inorganic, oxidic carrier and the transition-metal starting component is from 10:1 to 1:3, preferably from 5:1 to 1:2.

In step (2), the solvent or solvent mixture is evaporated until the intermediate has a dry consistency. This can be carried out at elevated temperature and under reduced pressure. The dry intermediate may still contain a complexed solvent.

To prepare the mixture in step (3), a 0.1 to 50% strength by weight, preferably about 25% strength by weight, suspension of the solid-phase intermediate (3) and a 5 to 80% strength by weight, preferably about 20% strength by weight, solution of the aluminum component (3.1) are preferably prepared in separate batches in hexane, heptane, petroleum ethers or mixtures thereof. The suspension and solution are then combined with stirring in such mixing ratios that the desired weight ratio is achieved. The organic carboxylate or the organosilicon compound or a mixture thereof in step (3.2) is added to this suspension with continued stirring. However, this step (3.2) component can also be added to the solution of the aluminum component (3.1) and subsequently added to the suspension of the solid-phase intermediate (3). The suspension is stirred for from 15 to 600 minutes, preferably from 6 to 300 minutes, at from −25° to 120° C., preferably from 25° to 80° C., completing the formation of the transition-metal catalyst component, which is in the form of a suspension. This can be used directly in the form of the resultant suspension as the transition-metal catalyst component (A). If desired, the solid-phase product (3) can be isolated and then employed as the transition-metal catalyst component (A). To this end, it is separated from the liquid phase by filtration, washed with pure solvent and dried, for example under reduced pressure.

The Ziegler catalyst system for the homopolymerization or copolymerization of ethene comprises
A) the transition-metal catalyst component according to the invention,
B) an organoaluminum catalyst component of the formula $AlR_mX_{3-m}$, where
   R is a $C_1$- to $C_{18}$-hydrocarbon radical,
   m is from 1 to 3, and
   X is OR, chlorine, bromine or hydrogen, and
C) an additional catalyst component which is either an organohalogen compound or an inorganic or organic nitrogen-oxygen compound.

Suitable compounds for component (B) are those mentioned in step (3.1). Triethylaluminum and tri-i-butylaluminum have proven particularly successful. Suitable compounds for the catalyst component (C) are additionally saturated aliphatic hydrocarbons, olefinically unsaturated aliphatic halogenated hydrocarbons, acetylenically unsaturated aliphatic halogenated hydrocarbons, aromatic halogenated hydrocarbons and olefinically unsaturated aliphatic halogenated carboxylates, nitrogen oxides, nitroso and nitro compounds and nitrites and nitrates, such as NO, $NO_2$, $N_2O$, nitrosodiphenylamine, nitrobenzene, nitromethane, i-butyl nitrite, i-amyl nitrite and i-propyl nitrate, as mentioned, for example, in EP 166 888, U.S. Pat. No. 3,462,399 and German Laid-Open Application DE-OS 1 545 111. Preference is given to chloroform, 1,1,1-trichloroethane and Frigen-11.

Suitable polymerization processes are those of the prior art, such as suspension polymerization or dry-phase polymerization in a stirred or fluidized fixed bed, as described, for example, in U.S. Pat. No. 3,242,150, DE 32 39 883 and EP 0 004 645. In these processes, the transition-metal catalyst component (A) according to the invention can be introduced into the polymerization reactor in various ways. Thus, the transition-metal catalyst components (A), the organoaluminum component (B) and the additional catalyst component (C) can be introduced into the polymerization reactor
1. all at the same location,
2. the same 3 components at separate locations,
3. the transition-metal component (A) at one location and a mixture of (B) and (C) at a separate location, or
4. a mixture of the transition-metal component (A) and the organohalogen component (C) at one location and the additional catalyst (B) at a separate location.

The polymerization process, which is preferably carried out continuously, is suitable for the preparation of a homopolymer of ethene, but preferably a copolymer of ethene with minor amounts of a $C_3$- to $C_8$-, in particular a $C_4$- to $C_6$-α-monoolefin, it being possible for the latter to be in the form of an individual compound or a mixture of two or more monomers. Examples of α-monoolefins which are suitable for the copolymerization are propane, 1-n-butene, 4-methyl-1-pentene, 1-n-hexene, 1-n-heptene and 1-n-octene, preference being given to 1-n-butene, 1-n-hexene and 4-methyl-1-pentene or a mixture thereof. In general, from 0.1 to 10 mol %, based on the copolymer, of the higher α-monoolefin(s) are copolymerized.

The molecular weight of the polymer is adjusted using conventional regulators, in particular hydrogen.

EXAMPLES 1 TO 5

Preparation of the Transition-Metal Catalyst Component (A)

Steps (1) and (2)

16 g of silica having a particle diameter of from 20 to 45 μm, a pore volume of 1.7 cm³/g, and a surface area of 320 m²/g, and a solution of 19 g of a vanadium trihalide/alcohol complex of the formula $VCl_3 \cdot 4\ ZOH$, where Z is isopropyl, in 100 g of tetrahydrofuran were combined, and the resultant suspension was stirred briefly. The solid-phase step (1) intermediate formed was subsequently isolated by evaporating the volatile constituents in a rotary evaporator at 10 mbar and 70° C.

Steps (3) and (4)

20 g of the solid-phase intermediate obtained in step (2) were suspended in 90 g of n-heptane. A solution of 7.2 g of diethylaluminum chloride (DEAC) and one of the compounds (3.2) listed in the table in the molar ratio 1:1 (DEAC:compounds) in 30 g of n-heptane was added, and the resultant suspension was stirred at 65° C. for 120 minutes and filtered, and the product was washed three times with n-heptane and dried under reduced pressure. Analysis of the solid-phase product (4), i.e. catalyst component (A), gave a vanadium content of 0.0015 mol/g.

Polymerization

A 1 liter autoclave was charged with 500 ml of i-butane, 27 ml of 1-butene, 0.9 l (s.t.p.) of hydrogen, 15 mg of catalyst component (A), 1.5 mmol of tri-i-butylaluminum as catalyst component (B) and 0.1 mmol of trichlorofluoromethane as the organohalogen catalyst component (C). The mixture was then polymerized for 90 minutes at 80° C. with stirring and at an ethene partial pressure kept constant at 15.5 bar by regulation. The polymerization was then terminated by decompression.

TABLE

| Example No. | Component (3.2) | 1) P/C g of PE/ g of cat. | 2) [n] dl/g | 3) MFI g/10' | 4) Density g/cm³ | 5) XL % | 6) Q | 7) Screen analysis [mm] | | | 8) ESCR h |
|---|---|---|---|---|---|---|---|---|---|---|---|
| | | | | | | | | <0.5 | 0.5–1.0 | >1.0 | |
| 1 | Ethyl benzoate | 13760 | 1.46 | 5.9 | 0.950 | 2.6 | 12 | 3.5 | 73.5 | 23.0 | 13.3 |
| 2 | Tetraethoxysilane | 14080 | 1.50 | 4.7 | 0.951 | 2.1 | 13 | 5.3 | 71.6 | 23.1 | 13.4 |
| 3 | Trihexylchlorosilane | 14210 | 1.54 | 4.0 | 0.949 | 3.1 | 12 | 3.0 | 76.0 | 21.0 | 13.2 |

TABLE-continued

| Example No. | Component (3.2) | 1) P/C g of PE/ g of cat. | 2) [n] dl/g | 3) MFI g/10' | 4) Density g/cm$^3$ | 5) XL % | 6) Q | 7) Screen analysis [mm] | | | 8) ESCR h |
|---|---|---|---|---|---|---|---|---|---|---|---|
| | | | | | | | | <0.5 | 0.5–1.0 | >1.0 | |
| 4 | Hexamethyldisilane | 14020 | 1.58 | 3.6 | 0.951 | 2.9 | 12 | 6.7 | 69.5 | 23.8 | 13.5 |
| 5 | Hexamethyldisiloxane | 13510 | 1.64 | 3.1 | 0.950 | 2.3 | 13 | 5.5 | 75.4 | 19.1 | 13.8 |

1) P/C = catalyst productivity in g of PE/g of catalyst
2) Determined in accordance with DIN 53 735, 190° C. at a load of 2.16 kg
3) Determined in accordance with DIN 53 720
4) Determined in accordance with DIN 53 479
5) XL = xylene-soluble component The xylene-soluble component of the products prepared here is the part which remains dissolved after a polymer solution in xylene which is clear at the boiling point is cooled to 20° C. The concentration is adjusted to 1% strength.
6) Determined by gel permeation chromatography $Q = M_w/M_n$
7) Determined in accordance with DIN 53 477
8) ESCR = *Environmental stress cracking resistance*

We claim:

1. A transition-metal catalyst component for a Ziegler catalyst system, obtained by a process consisting essentially of:
   1) mixing an inorganic, oxidic carrier with a vanadium trihalide/alcohol complex of the formula VY$_3$nZ—OH, where
      Y is chlorine or bromine,
      n is from 1 to 6, and
      Z is a monovalent, saturated, aliphatic or hydrocarbon radical having not more than 10 carbon atoms,
   2) removing the solvent by evaporation to form a solid-phase intermediate,
   3) mixing the solid-phase intermediate with
   3.1) an organoaluminum catalyst component of the formula AlR$_m$X$_{3-m}$ where
      R is a C$_1$–C$_{18}$-hydrocarbon radical,
      m is from 1 to 3, and
      X is OR, chlorine, bromine or hydrogen and
   3.2) an organic carboxylate of the formula R$^1$COOR$^2$ where each of R$^1$ and R$^2$ is independently a C$_1$–C$_{18}$-hydrocarbon radical in an organic solvent to form a transition-metal catalyst component, and
   4) isolating the transition-metal catalyst component by filtration, washing and drying.

2. The transition-metal catalyst component of claim 1, obtained by using a silica- or silica/alumina-based carrier in step (1).

3. The transition-metal catalyst component of claim 1, obtained by using
   from 20 to 80 mol-% of the step (3.1) component and
   from 20 to 80 mol-% of the step (3.2) component,
with the proviso that the sum is 100 mol-% and the weight ratio between the step 2 solid-phase intermediate and aluminum in the step (3.1) component is in the range from 1:0.05 to 1:2.

4. A process for preparing a transition-metal catalyst component for a Ziegler catalyst system, the process consisting essentially of:
   1) mixing an inorganic, oxidic carrier with a vanadium trihalide/alcohol complex of the formula VY$_3$nZ—OH, where Y is chlorine or bromine, n is from 1 to 6, and Z is monovalent, saturated, aliphatic or araliphatic hydrocarbon radical having not more than 10 carbon atoms, in an inert organic solvent,
   2) removing the solvent by evaporation to form a solid-phase intermediate,
   3) mixing the solid-phase intermediate with a mixture of
   3.1) an organoaluminum catalyst component of the formula AlR$_m$X$_{3-m}$ where
      R is a C$_1$–C$_{18}$-hydrocarbon radical,
      m is from 1 to 3, and
      X is OR, chlorine, bromine or hydrogen and
   3.2) an organic carboxylate of the formula R$^1$COOR$^2$ where each of R$^1$ and R$^2$ is independently a C$_1$–C$_{18}$-hydrocarbon radical in an organic solvent to form a transition metal catalyst component, and
   4) isolating the transition metal catalyst component by filtration, washing and drying.

5. The process of claim 4, wherein a silica- or silica/alumina-based carrier is used in step (1).

6. The process of claim 4, wherein
   from 20 to 80 mol-% of the step (3.1) component and
   from 20 to 80 mol-% of the step (3.2) component are used,
with the proviso that the sum is 100 mol-% and the weight ratio between the step 2 solid-phase intermediate and aluminum in the step (3.1) component is in the range from 1:0.05 to 1:2.

* * * * *